SYSTEM FOR EXTRACTING WORD AND BIT SYNCHRONIZATION SIGNALS FROM PCM WAVE FORM

Filed Nov. 3, 1959

INVENTOR.
DANIEL D. McRAE
BY Hurvitz & Rose
ATTORNEYS

United States Patent Office 3,200,198
Patented Aug. 10, 1965

3,200,198

SYSTEM FOR EXTRACTING WORD AND BIT SYNCHRONIZATION SIGNALS FROM PCM WAVE FORM

Daniel D. McRae, Melbourne, Fla., assignor to Radiation, Inc., Melbourne, Fla., a corporation of Florida Filed Nov. 3, 1959, Ser. No. 850,608
5 Claims. (Cl. 178—69.5)

The present invention relates to synchronizing systems and, more particularly, to a system for synchronizing the frequency of one oscillator with the frequency of another oscillator located at a location remote from the location of the first oscillator.

The present invention is particularly applicable to, though not necessarily limited to, the field of pulse code modulation and, more particularly, to synchronizing the operation of the de-coding equipment of a pulse code modulator with the transmitting equipment of the modulator. In systems of the type with which the present invention is particularly concerned, it is necessary for the ground receiving equipment to be synchronized with the transmitting equipment. In the prior art, a number of approaches have been employed to produce such synchronization but these have been quite complex and costly and in many instances have not proved to be wholly satisfactory.

It is, therefore, an object of the present invention to provide an apparatus for synchronizing a local oscillator with a remotely located oscillator which system is dependable and utilizes relatively simple equipment.

It is another object of the present invention to provide a system for synchronizing a pair of oscillators in which correlation techniques are employed to determine frequency coincidence between the two oscillators.

It is still another object of the present invention to multiply an incoming pulse code modulated wave form with a locally generated wave form and to integrate the results of the multiplication in order to extract synchronizing signals from a serial pulse code wave form.

In systems with which the present invention is employed, information is transmitted in accordance with pulse code modulation techniques in which each word of information is represented by a plurality of information pulses or bits. In the specific illustration to be described, the pulse code modulation information is transmitted in the form of positive pulses, negative pulses and no pulses. In accordance with the invention, each word is provided with at least one synchronizing bit having a predetermined location in the word, with the number of synchronizing bits per word being a matter of choice depending upon the degree of dependability desired. In the illustration of the system to be described, a single synchronizing bit is employed for each word and the synchronizing bits alternate between a positive and a negative pulse in successive words. A voltage-controllable, variable-frequency oscillator is employed to generate a local signal having a frequency which corresponds with the frequency of the information bits as determined by an oscillator located at the transmitter. The frequency of the output voltage of the local oscillator is divided down to the word repetition frequency so that the locally generated wave train comprises single voltage pulses, each followed in time by a dead period equal to the time interval allotted to information pulses and therefore, is identical in form to the incoming wave train formed by the synchronizing bits. A voltage is derived which is proportional to the correlation function of the incoming wave train and the locally generated wave train. If the pulses of the locally generated wave train occur during intervals allotted to information pulses in the received pulse train then the correlation function is substantially zero and no output voltage is obtained. If the pulses of the incoming and local wave trains coincide exactly in time, the correlation function is one and a maximum output voltage is obtained. If the pulses of the two wave trains are synchronized as to frequency but are slightly phase shifted with respect to one another so that they only partially overlap then a correlation function of between zero and one is obtained and the output voltage is at an amplitude between zero and a maximum. The local oscillator and its control circuit are adjusted so that the local oscillator oscillates at the proper frequency when the output voltage of the correlator is at a magnitude between zero and maximum so that if the wave shifts in phase slightly, this being an indication of a small change in frequency, the output voltage of the correlator varies in a sense to cause a correction of the frequency of oscillation of the local oscillator.

In a specific embodiment of the invention, the incoming wave train is applied to a multiplier and is therein multiplied by the locally generated wave. The incoming synchronizing and information pulses are in the form of positive pulses, negative pulses, and no pulses and the locally generated signals are in the form of positive, negative and no pulses. The product of the two positive pulses is a single positive pulse output, the product of a negative and a positive pulse is a single negative pulse output, the product of a positive pulse and no pulse is no output pulse and the product of two negative pulses is a single positive pulse. These output pulses are integrated and the resulting voltage employed to control the frequency of oscillation of the local oscillator. If the voltage required to stabilize the local oscillator is a positive voltage of a predetermined amplitude which requires a partial coincidence of the local and generated signal during each word interval, then obviously if the locally generated signal occurs during the information period of the word, the probability of the required voltage being applied to the local oscillator is quite remote and the frequency of the local oscillator will be incorrect. As a result, the time of occurrence of the locally generated signal varies with respect to the time of occurrence of the incoming synchronizing signals and, therefore, effectively, the phase of the locally generated signal is varied until it eventually coincides with the received signal. At this time, the proper voltage is developed at the output of the correlator and the frequency of oscillation of the local oscillator is stabilized.

In accordance with another feature of the present invention, a unique multiplier circuit is employed. As indicated above, a specific voltage output is required to stabilize the frequency of the local oscillator but this voltage may initially be arbitrarily chosen and circuits thereafter designed to operate on this voltage. Therefore, it is possible to employ a system in which the voltage of the positive pulses is plus one volt, the voltage of the negative pulses is minus one volt and no voltage is employed to indicate a no pulse condition. Multiplication of such a function then merely requires that when a positive pulse is multiplied by a positive pulse a one voltage positive pulse is developed at the output of the multiplier, when any type of pulse is multiplied by no pulse, no voltage is developed, when a negative pulse is multiplied by a positive pulse, a one volt negative pulse is developed and a one volt positive pulse is also developed when two negative pulses are multiplied. In the apparatus employed, the incoming signal is applied to a phase splitter, which produces one output pulse having the same phase as the applied signal and a second output pulse having a phase opposite to that of the opposite signal and the locally generated wave train is employed to gate the proper pulse to the filter. The synchronizing bits employed in this system are represented by alternating positive and negative pulses which occur in successive word intervals. When the local oscillator is completely synchronized with the remote oscillator, it should produce alternate positive and negative pulses which correspond in time with the synchronizing pulses of the incoming train. However, since multiplication of minus one by minus one produces plus one, a properly timed positive pulse of the local signal may be employed to gate an inverted negative pulse (a positive pulse) from the phase splitter to the output circuit and, in consequence, the local oscillator need generate only positive pulses.

It is another object of the present invention to provide a pulse code modulator synchronizing system in which the correlation product of a local and remote oscillator is derived and the frequency of the local oscillator is varied until the correlation function is equal to a predetermined value between zero and one.

It is another object of the present invention to provide a novel multiplication circuit which may be employed in combination with an integration circuit to derive a correlation function of the output pulses of two pulse-type oscillators.

It is yet another object of the present invention to provide a synchronizing system employing a novel multiplier which comprises a pulse gating system only.

The above and still further objects, features and advantages of the present invention will become apparent upon consideration of the following detailed description of one specific embodiment thereof, especially when taken in conjunction with the accompanying drawings, wherein:

FIGURES 2A, 2B and 2C are graphs of voltage wave forms employed to explain the operation of the apparatus.

Figures 1, 2, 3:
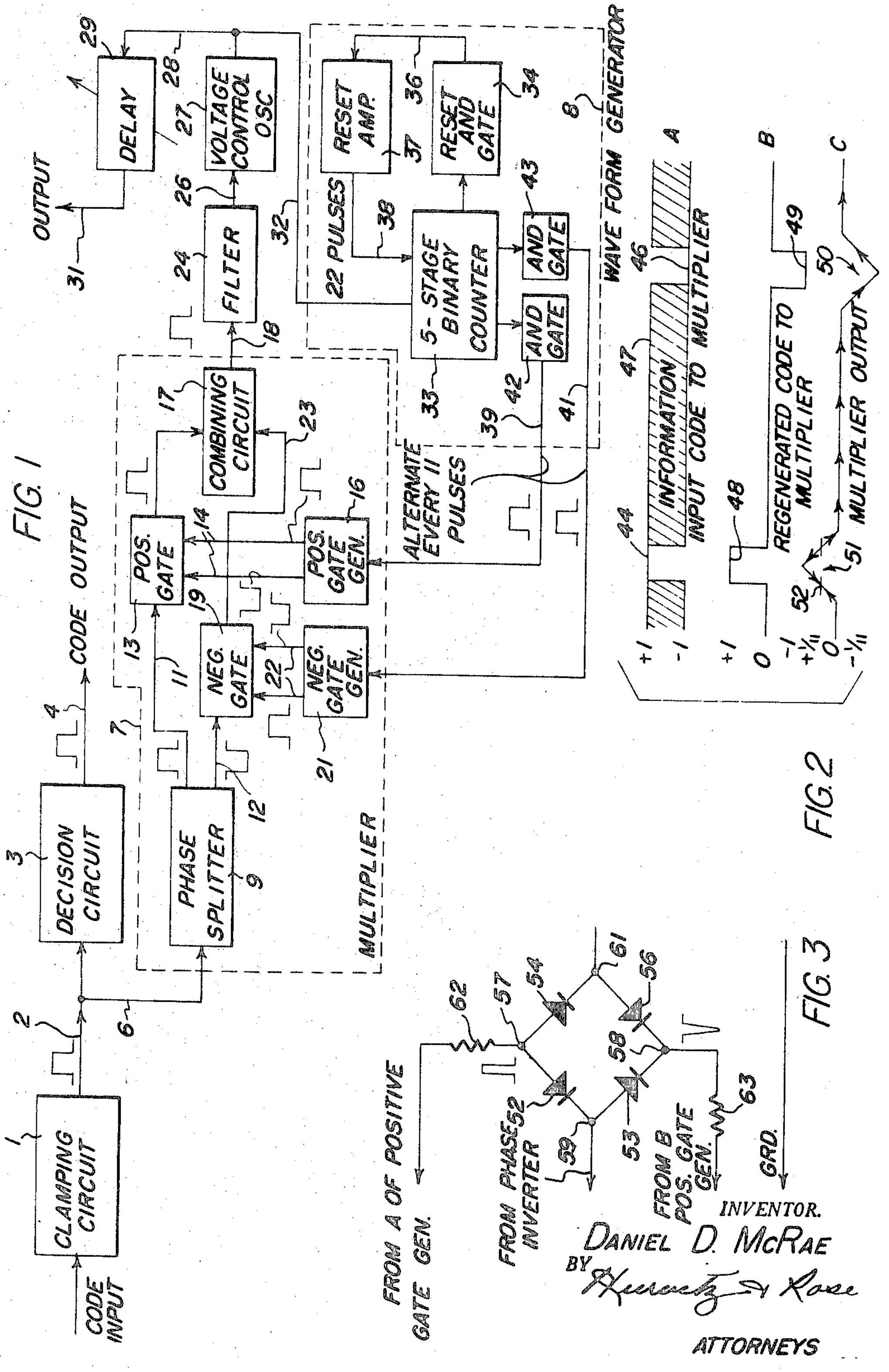
FIGURE 1 is a schematic block diagram of the circuit of the present invention.
FIGURE 3 is a schematic wiring diagram of a gate employed in the apparatus.

Referring now specifically to FIGURE 1 of the accompanying drawings, an incoming wave train of pulses is applied to a clamping circuit 1 which clamps the zero level of the incoming pulses to a predetermined but variable D.C. level. The output pulses from the clamping circuit 1 are applied via a lead 2 to a decision circuit 3 which is employed to determine the polarity of the incoming signal and to produce a positive pulse on output lead 4 wherever the voltage of the incoming pulse is above a predetermined level and to produce no voltage when the incoming signal is below a predetermined level. The clamping and decision circuits 1 and 3 respectively are elements which are well known in the art and form no part of the present invention.

The pulses are also applied via a lead 6 to a multiplier circuit 7 employed to multiply instantaneously the incoming pulses with a wave train produced by a wave form generator 8. The multiplier 7 comprises a phase splitter 9 which derives pulses directly from the lead 6 and produces an in phase pulse on an output lead 11 and an inverted pulse on an output lead 12. The lead 11 is applied as one input to a positive gate 13 which receives a gating voltage over a lead 14 from a positive gate generator 16. The voltage pulses gated through the positive gate 13 are applied to a combining circuit 17 which applies the pulses received thereby to an output lead 18 of the multiplier circuit 7. The pulses appearing on the lead 12 are applied as one input signal to a negative gate 19 which receives gating pulses from a negative gate generator 21 via a lead 22. Pulses passed through the negative gate 19 are applied to an output lead 23 which is connected as a second input lead to the combining circuit 17.

The output voltage from the lead 18 is applied to a filter network 24 which integrates the voltage pulses applied thereto and produces a voltage on its output lead 26 which is an average of the voltage applied thereto over each information word period, which in the form of the system described is taken to be equal to eleven pulse intervals. The voltage appearing on the lead 26 is applied as a frequency control voltage to a voltage-controllable, variable-frequency oscillator 27 which is the element whose frequency of oscillation is to be synchronized with a remote oscillator. The output oscillations from the oscillator 27 are applied via a lead 28 through a variable delay 29 to a synchronizing pulse output lead 31. The pulses appearing on the output lead are the bit synchronizing pulses that it is desired to employ in synchronizing the ground equipment.

The voltage oscillations appearing on the lead 28 are also applied via a lead 32 to the wave form generator 8 and, more specifically, are applied directly to a five-stage binary counter 33. Since a five-stage binary counter is capable of counting to 32 and, for purposes which will become apparent subsequently, it is desired to reset the counter at every twenty-second pulse a reset coincidence gate 34 is employed to detect the occurrence of every twenty-second count in the binary counter 33. Upon such an occurrence, the reset gate 34 applies a pulse via a lead 36 to a reset amplifier 37 which, via a lead 38, supplies a reset pulse to the grid of one tube of each of the five stages of the binary counter 33 to reset the counter to a zero count. For reasons which will become apparent subsequently, it is desired to produce a pulse on the first output lead 39 of the wave form generator each time the binary counter 33 is reset to zero and to produce a positive output pulse on a second output lead 41 from the generator 8 each time the counter 33 obtains a count of 11 so that a pulse is applied in alternation to the leads 39 and 41 for every 11 pulses applied to the counter 33. Pulses are developed on the lead 39 by a coincidence gate 42 having input leads connected to the anodes of various tubes of the counter 33 such that when all of the tubes are reset to their zero condition gate 42 is open. Similarly, there is provided a coincidence gate 43 having input leads connected to the anodes of the tubes of the binary counter 33 in such an arrangement that a pulse is produced on the lead 41 whenever the counter obtains a count of 11. The leads 39 and 41 are connected to the positive gate generators 16 and negative gate generator 21, respectively, and the generators are such that each time a pulse appears on the lead associated therewith, it produces a positive pulse on its corresponding output lead.

The theory of operation of the apparatus of the present invention can be explained with reference to FIGURE 2 in which the wave form A represents the input code to the multiplier; the wave form B represents the output of the wave form generator 8 applied to the multiplier 7 and the wave form C relates to the amplitude of the voltage developed by the filter 24. Referring initially to FIGURE 2A, each information word contains a synchronizing bit and ten information bits. In the specific embodiment under discussion, it is assumed that the single synchronizing bits alternate from a positive pulse to a negative pulse between words, the positive pulse being designated by the reference numeral 44 and the negative pulse being designated by the reference numeral 46. The information bits are distributed throughout a shaded area designated by the reference numeral 47. The input wave to the multiplier from the wave form generator 8 contains one bit for each word interval and these bits alternate between positive and negative gate pulses in correspondence with the alternation between positive and negative pulses of the synchronizing bits contained in each word of the received pulse. In FIGURE 2B, the positive gate pulse is represented by the reference numeral 48 and the negative gate pulse is represented by the reference numeral 49. In discussing the operation of the apparatus of the invention, certain parameters of the circuit and system should be established. It is assumed that the output pulses from the clamping circuit 1 are varied between plus one volt for a positive pulse and minus one volt for a negative pulse and that the gate pulses are of the same amplitude. The filter 24 integrates the pulses coming from the multiplier 7 over a period equal to the time of a single word which contains ten information pulses and one synchronizing pulse and, therefore, integrates the signal over an interval equal to eleven pulse times. As will become apparent subsequently, the net output of the multiplier is one output pulse for each word interval and, therefore, the average maximum output voltage from the filter 24 is equal to one-eleventh of a volt. Further, it is assumed initially that the oscillator 27 oscillates at the same frequency as the transmitting oscillator when the voltage appearing on the lead 26 is equal to one twenty-second of a volt, this indicating a correlation function of one-half. Also, the frequency of the oscillator 27 decreases with a decrease in the voltage on the lead 26 and increases with an increase of the voltage on the lead 26. It is further assumed that the frequency of oscillation of the oscillator 27 is quite close to the frequency of the oscillation of the remote oscillator with which it is to be synchronized and that, at the start of operations, the pulse 48 is generated at a time removed at least one full pulse time from the incoming synchronizing pulse 44 of an incoming word. Under these circumstances, no net output pulse is developed by the multiplier 7 and the voltage on the lead 26 must necessarily fall toward zero voltage. It is possible, of course, that the pulse 48 might coincide with a positive information pulse occurring in the region 47 of the input word but on a cyclic basis, the probability of the pulse 48 coinciding repeatedly with an information pulse is quite small so that the average voltage of the filter 26 is less than one twenty-second of a volt. More specifically, since the probability of a positive pulse and a negative pulse occurring at any given time during the interval 47 is approximately 50 percent and the probability that the pulse 48 will exactly coincide with one of these pulses on a repetitive basis is, of necessity, less than one, the voltage on lead 26 must be below one twenty-second of a volt. Therefore, the frequency of the oscillator 27 is less than the frequency of the remote oscillator producing pulses 44 and 46 and this has the effect of shifting the pulse 48 of FIGURE 2B to the right with respect to the pulse 44 which is assumed to be stationary with respect to time. In consequence, after an extended period of time, the pulse 48 will first correspond in time with the pulse 46 and produces a negative pulse 50 at the filter 24 and further reduces the voltage on the output lead 26. This further reduces the frequency of oscillation of the oscillator 27 and speeds up the shift of the pulse 48 to the right. Continued shift of the pulse 48 to the right finally brings it into partial time agreement with a further pulse 44 and the voltage on the lead 26 begins to rise. The increase of voltage on the lead 26 is indicated by the region 51 of the curve of FIGURE 2C and when the pulses overlap in time by one-half a pulse width (a correlation function of one-half), the voltage on the lead 26 reaches a magnitude of one twenty-second of a volt at which time the operation of the circuit is stabilized. If the frequency of the oscillator 27 attempts to increase, this effectively shifts the pulse 48 to the right and tends to bring the pulse into complete time coincidence with the pulse 44. The width of the output pulse on the lead 18 now increases, thereby increasing the voltage on the lead 26. An increase of voltage on the lead 26 produces an increase in the frequency of the oscillator 27 which shifts the pulse 48 to the left until the pulses 44 and 48 again overlap by only 50 percent in time which is the stable operating point producing one twenty-second of a volt on the output lead 26. If the frequency of the oscillator 27 decreases, then the pulses 44 and 48 overlap by less than 50 percent and the voltage on the lead 26 decreases. A decrease in voltage on the lead 26 further decreases the frequency of oscillation of the oscillator 27 and the pulse 48 begins to shift to the right with respect to the pulse 44 producing a greater interval of overlap between the two pulses and, therefore, increases the voltage on the lead 26. In consequence, the one twenty-second of a volt point, designated by the reference numeral 52, which lies on the left side of the portion of the pulse 51 of FIGURE 2C is the stable operating point for the circuit and regardless of whether the frequency of oscillation of the oscillator 27 is greater or less than the frequency of the remote oscillator, the entire pulse train produced by the local oscillator is shifted in time with respect to the incoming synchronizing pulse train until coincidence is produced between the positive pulses of the system at which time the frequency of the local oscillator is stabilized to the remote frequency.

It is apparent that the function of the multiplier is to instantaneously multiply the incoming wave train by that produced by the wave form generator 8. Since the theory of operation of the synchronizer loop puts no restriction on the magnitude of the locally generated wave forms, the levels corresponding to positive and negative pulses and no pulse may be selected as one, minus one and zero. The multiplication by plus one is the same as passing the original code, multiplication by minus one is equivalent to passing an inverted form of the wave train and multiplication by zero corresponds to not passing the wave train.

Referring now again to FIGURE 1 of the accompanying drawings, each incoming pulse which appears on the lead 6 is applied to a phase splitter 9 which produces on its output lead 11 a pulse having the same polarity as the pulse on the lead 6 while a pulse of an opposite polarity appears on the lead 12. If the positive pulse on the lead 11 coincides with a positive pulse on the lead 14, then a positive pulse of the same amplitude as that appearing on the lead 11 is passed through the combining circuit to the output lead 18, this indicating a multiplication of plus one times plus one. If positive pulses occur simultaneously, on leads 12 and 22 a positive pulse is gated to the output, this indicating a multiplication of minus one by minus one. If a negative pulse appears on the lead 11 at the same time as a positive pulse appears on the lead 14, then a negative pulse is passed through the gate 13 and combining circuit 17 to the output lead 18. Similarly, if a negative pulse on the lead 12 coincides with a positive pulse on the lead 22, a negative pulse appears on the lead 18.

Referring now to FIGURE 3 of the accompanying drawings, there is illustrated a gate structure which may be employed for both of the gates 13 and 19, it being necessary for these gates to pass both positive and negative input pulses in response to the application of gate pulses thereto. The gate comprises a diode bridge including diodes 52, 53, 54 and 56. The diodes 54 and 56 are connected in series with one another between junction points 57 and 58 and have their cathode and anode respectively connected to terminal 61. Similarly, diodes 52 and 53 are connected in series between terminals 57 and 58 and have their cathode and anode, respectively, connected to terminal 59. A junction 59 of the diodes 52 and 53 is adapted to receive signals from the phase splitter 9. The diodes 54 and 56 are also connected in series between the leads 57 and 58 with the cathode of the diode 54 connected to the anode of the diode 56. A junction 61 between the diode 54 and 56 constitutes the output terminal of the gate which is connected in FIGURE 1 to the combining circuit 17. The junction 57 is connected via a resistor 62 to a source of positive gating pulses while the lead 58 is connected through a resistor 63 to a source of negative gating pulses, each pair of positive and negative gating pulses being generated by one of the generators 21 and 16 and occurring simultaneously. Upon the application of a positive pulse to the junction 57 concurrently with the application of a negative pulse to the junction 58, the gate is open and a positive input pulse proceeds through diodes 53 and 56 to the output terminal 61. If the negative input pulse is applied to the terminal 59, it proceeds via diodes 52 and 54 to the output terminal 61.

Thus, regardless of the polarity of the input pulse applied to the junction 59, it is gated to the output junction 61 just so long as there is a time coincidence between the input pulses and the gating pulses applied to the terminals 57 and 58. Of course, the width of the output pulse applied to the terminal 61 is determined by the degree of time coincidence between the various applied pulses and if the pulse applied to the junction 59 coincides with only half its width with the pulses applied to the junctions 57 and 58, then a pulse appears at the output junction 61 having a width equal to only half the width of the input pulse. It is, of course, this width of pulse which determines the stable operating characteristics of the system as indicated in the discussion of FIGURE 2 of the accompanying drawings.

The gate generators 16 and 21 may take various forms and in one example may constitute monostable multivibrators having the two gate pulse taken from the anodes of the two tubes employed in the multivibrator. The width of the gated pulses depends, of course, upon the time constant of the oscillator circuit.

The pattern of synchronizing bits employed is not limited to the pattern disclosed and several bits per word may be employed. The apparatus must be modified only to the extent necessary to produce gate pulses at the proper times on the proper leads and this is readily achieved by coincilence gates such as the gates 42 and 43.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a circuit for synchronizing the frequency and phase of a signal generator in accordance with the reception of specified recurrent pulses of an incoming pulse train, means coupled to receive said incoming pulse train for deriving from each pulse thereof simultaneous pulses of alternate polarity, plural gating means, each of said gating means being effective when energized to pass pulses of either polarity, means for applying only that pulse of said simultaneous pulses of the same polarity as that of the pulse from which it is derived to one of said gating means, means for applying only that pulse of said simultaneous pulses of opposite polarity to that of the pulse from which it is derived to another of said gating means, means coupled to said plural gating means for controlling the output signal frequency of said signal generator in accordance with the amplitude and width of pulses passed by said plural gating means, means coupled to said signal generator for producing synchronizing pulses separated by intervals proportional to the frequency of said output signal, and means coupled to said last named means and to said plural gating means for alternately energizing said one and said another gating means to pass only those portions of said pulses applied to said gating means coincident in time with said synchronizing pulses.

2. In a pulse code modulation receiver for receiving information in the form of serial pulse code word groups having specified bits of each code word forming a recurrent pulse pattern, a system for synchronizing the frequency of an oscillator of the receiver with the recurrent pulse pattern, said system comprising means for multiplying said recurrent pulse pattern by at least a recurrent portion of the wave train produced by said oscillator to produce a voltage indicative of the product of said multiplication, said multiplying means including means coupled to receive said pulse code word groups and to derive from each pulse thereof simultaneous pulses of alternate polarity, plural gating means, means for applying only that pulse of said simultaneous pulses of the same polarity as that of the received pulse from which it is derived to one of said gating means, means for applying only that pulse of said simultaneous pulses of opposite polarity to that of the received pulse from which it is derived to another of said gating means, and means coupled to said oscillator for alternately energizing said one and said another gating means to pass portions of only said applied pulses coincident with said recurrent portion of said wave train, integrating means coupled to said multiplying means for producing a control voltage proportional to the integral of said voltage taken over one word time; said oscillator including means for controlling the frequency of oscillation thereof in response to said control voltage, said oscillator frequency being synchronized with said pulse pattern when said control voltage is of a predetermined magnitude between a maximum and a minimum value.

3. The combination according to claim 2 further including means for clamping each pulse of said received pulse code word groups at a fixed D.C. reference level, and means for applying said clamped pulses to said means for deriving simultaneous pulses.

4. In a pulse code modulation receiver for receiving information in the form of code words, each word including a group of serial pulses of random polarity and having specified pulses forming a recurrent pulse pattern in successive words, consecutive pulse patterns being spaced by a predetermined time interval equal to the time interval embraced by each word, a system for synchonizing the frequency and phase of the output signal from a controllable signal generator of the receiver with the reception of said recurrent pulse pattern, said system comprising means for clamping each received pulse at a fixed D.C. reference level, means coupled to said clamping means to derive from each clamped pulse simultaneous pulses of alternate polarity, plural gating means, means for applying only that pulse of said simultaneous pulses of the same polarity as that of the clamped pulse from which it is derived to one of said gating means, means for applying only that pulse of said simultaneous pulses of opposite polarity to that of the clamped pulse from which it is derived to another of said gating means, means coupled to said signal generator for producing synchronizing pulses separated by intervals representative of the frequency of said output signal, means responsive to said synchronizing pulses for alternately energizing said one and said another gating means to pass only the portions of said applied pulses coincident in time with said synchronizing pulses, means for integrating the pulse portions passed by said plural gating means over the time interval of each word to produce a control signal variable within maximum and minimum amplitude limits, said signal generator including means responsive to the amplitude variations of said control signal to vary the output signal frequency thereof, said synchronizing pulses being coincident in time with said recurrent pulse pattern when said control signal has a predetermined amplitude within said amplitude limits.

5. A system for synchronizing a voltage controlled oscillator with a wave of reference frequency, said wave having first and second recurrent discrete values, comprising means coupled to said oscillator for deriving sequential pulses from the output signal thereof having a predetermined time relation to the frequency of said output signal, means coupled to receive said wave for deriving from each of said values concurrent pulses of alternate polarity, plural gating means, means for applying only that pulse of said concurrent pulses of a first polarity to one of said gating means, means for applying only that pulse of said concurrent pulses of polarity opposite to said first polarity to another of said gating means, means for alternately applying said sequential pulses to said one and said another gating means, each of said gating means responsive respectively to the application of said sequential pulses and said alternate polarity pulses thereto to pass those portions of said last named pulses coincident with said sequential pulses, means coupled to each of said gating means for deriving a control voltage from said pulse portions passed thereby, said oscillator including means responsive to said control voltage for varying the frequency of said output signal in proportion to the magnitude of said control voltage.

References Cited by the Examiner

UNITED STATES PATENTS

| | | | |
|---|---|---|---|
| 2,292,944 | 8/42 | Hudec | 178—69.5 |
| 2,800,583 | 7/42 | Gerks | 250—20.7 |
| 2,843,669 | 7/58 | Six et al. | 178—69.5 |
| 2,882,338 | 4/59 | Wozencraft | 250—8.34 |
| 2,939,914 | 6/60 | Ingham | 178—66 |
| 2,949,503 | 8/60 | Andrews | 179—15 |
| 2,957,943 | 10/60 | Rack | 179—15 |

DAVID G. REDINBAUGH, *Primary Examiner.*

GEORGE WESTBY, L. MILLER ANDRUS, *Examiners.*